United States Patent [19]

Perotti

[11] Patent Number: 4,850,878

[45] Date of Patent: Jul. 25, 1989

[54] METHOD FOR SIGHTING ENGINE COMPONENTS

[76] Inventor: Robert W. Perotti, 10222 Bushman Dr., Unit 8113, Oakton, Va. 22124

[21] Appl. No.: 777,186

[22] Filed: Sep. 18, 1985

[51] Int. Cl.[4] .......... G09B 250/00

[52] U.S. Cl. .......... 434/374; 40/594; 40/912; 116/DIG. 42; 116/201; 434/219

[58] Field of Search .......... 40/593, 594, 912; 434/373, 374, 153, 219; 184/6.4, 108; 33/126.7 R, 347, 332; 116/DIG. 41, 334, 201, DIG. 42, 200, 28 R, 327, 209; 141/94, 326; 74/DIG. 7; 296/38; 493/961; 283/34, 35, 37, 70, 81

[56] References Cited

U.S. PATENT DOCUMENTS

| | | | |
|---|---|---|---|
| 1,089,741 | 3/1914 | Batterson | 434/153 |
| 1,551,954 | 9/1925 | Hodgart | 116/334 |
| 2,620,765 | 12/1952 | Worel | 116/334 |
| 3,025,826 | 3/1962 | Markovich | 116/334 |
| 3,120,067 | 2/1964 | Burke | 116/200 |
| 3,448,332 | 6/1969 | Nesbitt | 315/77 |
| 4,233,704 | 11/1980 | Sartorio | 15/210 B |
| 4,235,459 | 11/1980 | Callahan | 40/594 |
| 4,322,713 | 3/1982 | Duck et al. | 340/59 |
| 4,474,557 | 10/1984 | Clossey | 434/153 |

FOREIGN PATENT DOCUMENTS

| | | | |
|---|---|---|---|
| 1964132 | 6/1971 | Fed. Rep. of Germany | 283/37 |

OTHER PUBLICATIONS

"Chrysler", *Automotive Principles and Service;* 1984, Thiessen.

"Welch", Welch Physics Digest; 1951.

*Primary Examiner*—Richard C. Pinkham
*Assistant Examiner*—Mark S. Graham
*Attorney, Agent, or Firm*—Dennis H. Lambert

[57] ABSTRACT

A method for sighting engine components in an engine compartment by first locating a desired perimeter label which is brightly colored and then to envision a straight line from that label to the respective engine component. The engine component will have detection means similar in color to the label to thereby provide immediate recognition. Certain hidden components may also be sighted with the use of two perimeter labels which have respective envisioned straight lines intersecting at the component's location.

7 Claims, 3 Drawing Sheets

FIG. 3

METHOD FOR SIGHTING ENGINE COMPONENTS

BACKGROUND OF THE INVENTION

This invention relates to a method for more readily sighting engine components such as oil and transmission fluid dipsticks, in-line filters, fluid reservoirs and other routine maintenance components. Routine maintenance of an engine, especially automobile and truck engines, requires the periodic check of engine fluid levels. In the past, sighting such engine components as the aforenoted dipsticks has been difficult even for the trained eye. Quite often the engine compartment is soiled due to engine fluid seepage onto the block and about the engine compartment walls. Road debris is also blown-up from underneath the vehicle thereby depositing road salts and mud, etcetera, into the engine compartment and onto the engine block and components. It therefore becomes a messy matter to lean over the engine to look for the engine components which are still further hidden by other engine components e.g. the air filter housing, hoses, heat baffles or other accessories.

Presently, the market bears no real solution to this problem. U.S. Pat. No. 4,322,713 simply discloses an expensive electronic dipstick which is directed towards monitoring the oil level such that one presumably never has to open the hood to check the crankcase oil level.

U.S. Pat. No. 4,233,704 simply shows a device for cleaning a dipstick. The patent does not disclose any means which would lead one to sighting the dipstick in a more rapid manner. In fact, such a device may even hamper sighting the dipstick due to its odd shape.

U.S. Pat. No. 3,448,332 shows a device to illuminate a dipstick which includes an electric lamp which only operate once the dipstick is removed.

Also available in the market today through automobile specialty retailers are chrome dipsticks. The graspable portion of the chrome plated dipstick could be in differing shapes such as daggers and the common looped ring. Chrome plating of engine parts is popular among car enthusiasts but does not readily improve the ability of one to sight the dipstick unless it is the sole chrome part in that general area of the engine.

SUMMARY OF THE INVENTION

This invention provides a means for readily sighting engine components located within an engine compartment. It is also an object of this invention to provide immediate identification of the engine component. It is a further object of this invention to perform the above with the greatest ease, to make the device simple in construction, to make it reliable and resistant to heat deformation and to make the device inexpensive to manufacture.

According to the present invention, because of the provisions that the invention provides immediate identification as well as location of the engine components, each embodiment of the invention comprises brightly colored detection means. In each embodiment the colors can be applied as coatings or may be incorporated into the materials which form a part of this invention.

Other objects, features and advantages of the present invention will become subsequently apparent by reading the following description which has been prepared in conjunction with the accompanying drawings forming a part hereof, wherein like numerals refer to like parts throughout.

BRIEF DESCRIPTION OF THE DRAWINGS

The accompanying drawings will be briefly described below.

DESCRIPTION OF THE PREFERRED EMBODIMENTS

Figure 1:
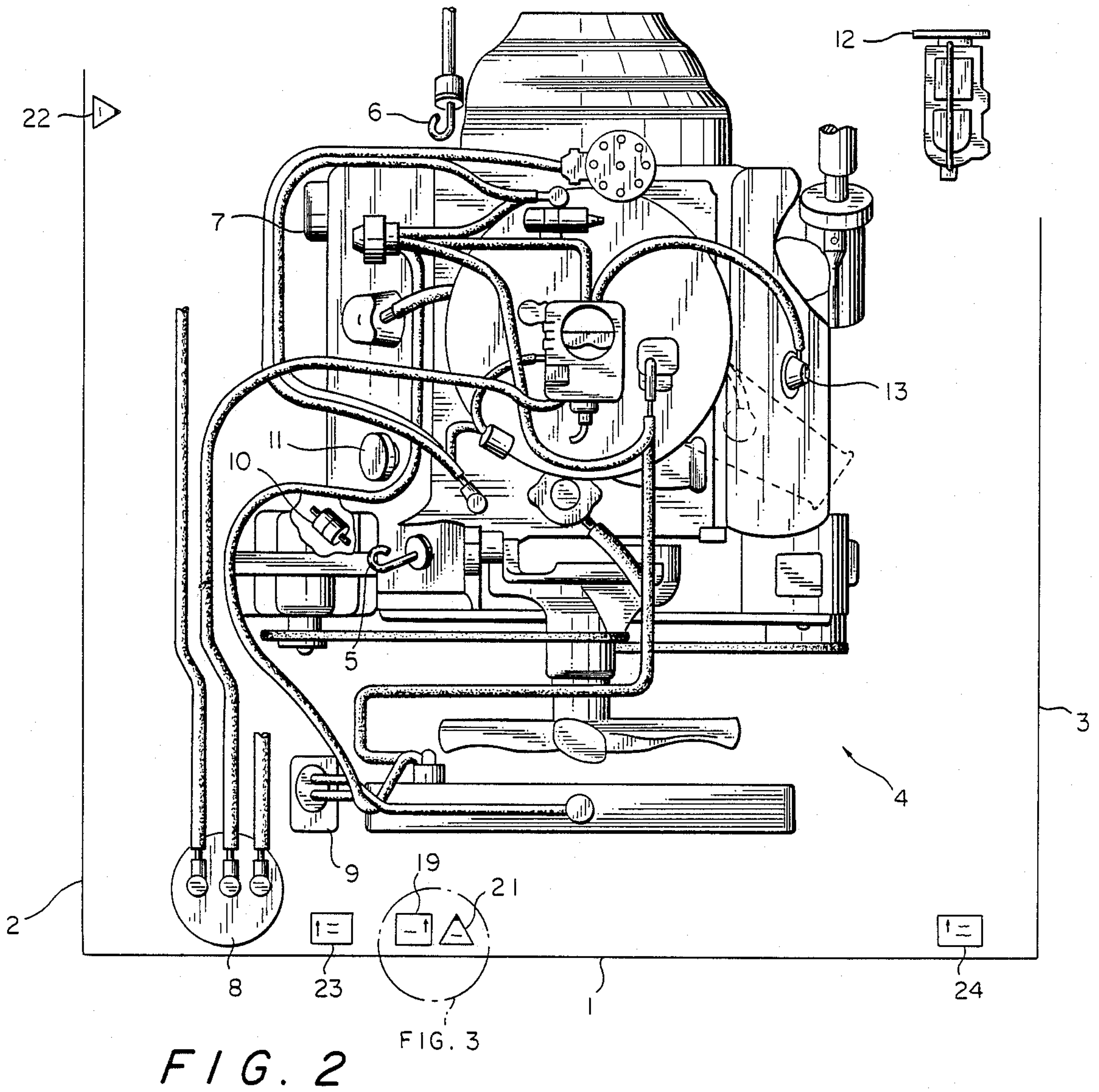
FIG. 1 is a perspective view of an engine compartment to which the present invention is applied.

Referring now to the drawings, and in particular to FIG. 1, the engine compartment according to the present invention has a forward wall 1 as well as a left side wall 2 and right side wall 3. The engine compartment of FIG. 1 also has a fourth wall (not shown) which would, in this instance, be a firewall separating the passenger compartment from the engine compartment. In this preferred embodiment as shown in FIG. 1. the engine is longitudinally mounted and the hood (not shown) pivots about brackets mounted to the firewall such that the forward portion of the hood is raised in a means to allow access to the engine compartment. It is readily understood that the present invention is applicable to all engine compartments, meaning those located rear body, mid body, or as in the majority, front body. The front body engine compartments can also house an engine either longitudinally or transversely mounted. The hood, as will also become apparent, can also pivot in any manner.

Figure 2:
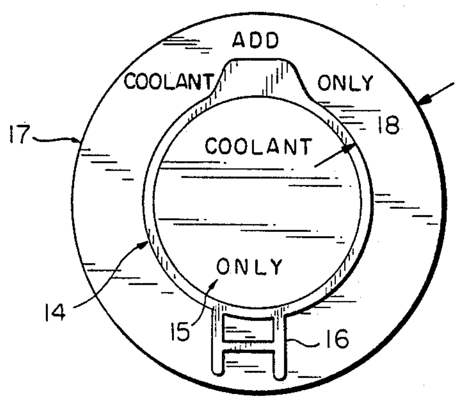
FIG. 2 PRIOR ART
FIG. 2 illustrates a conventional snap-on cap and ring which can be found secured to a fluid reservoir.

The engine compartment houses an engine 4. Although FIG. 1 depicts an engine compartment housing a V-8 type engine, it will be readily understood that the present invention is not restricted to such an engine or drive train arrangement. Located about and on the engine are several components which must be sighted or identified for the purpose of routine maintenance. Such routine maintenance includes a broad range of activities from periodic checks of critical engine fluids to replacement of parts such as filters at set intervals. FIG. 1 illustrates engine components such as a conventional crankcase oil dipstick 5, and an automatic transmission fluid dipstick 6. In the past sighting such engine components as the aforenoted dipsticks has been difficult even for the trained eye. Quite often the engine compartment is soiled due to engine fluid seepage onto the block and about the engine compartment walls. Road debris is also blown-up from underneath the vehicle depositing road salts and mud, etcetera, into the engine compartment and onto the engine block and components. It therefore becomes a messy matter to lean over the engine to look for the engine components which are still further hidden by other engine components e.g. the air filter housing. hoses, heat baffles or other accessories. FIG. 1 further illustrates such components as an oil filter 7, fuel vapor storage canister 8, coolant reserve system 9, fuel filter 10, oil fill cap 11, brake master cylinder 12 and PCV valve 13. Conventionally, as illustrated in FIG. 2, only those engine components with caps, either the threaded or snap-on type, were more readily identifiable. As shown in FIG. 2 there is a cap 14 held to a fluid reservoir by a flexible coupling 16. On the cap, which is usually plastic, there is raised lettering 15 warning as to which fluids can be added to the respective reservoir. Such raised lettering 15 did not however allow one to readily sight the reservoir since the raised lettering 15 is not different in color or composition to that of the cap 14. As a result, even reading the raised lettering 15 was often difficult. As an improvement to help locate the reservoir, a thin, floppy, plastic ring 17 having a relatively large band width 18 was provided. The rings 17 are very inexpensive to produce and are usually provided with warnings written in various languages. The rings 17 are, however, only useful on those reservoirs which have a projecting neck portion and cap such that the ring can encircle the neck portion below the cap and rest on the widened portion below the neck. The rings 17 are also very susceptible to wind due to their large band width 18 and floppy construction. Therefore, the rings 17 are not readily applicable to such components as power steering fluid pumps which usually have neck portions, but are located in turbulent wind areas due to their positioning in the engine compartment.

Figure 3:
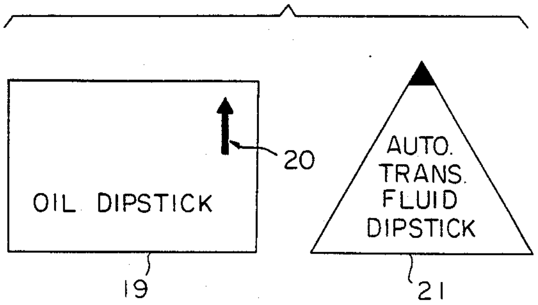
FIG. 3 is a close-up view of a portion of FIG. 1 and illustrates a means which provides a first step in sighting components according to the present invention.

FIG. 1 in conjunction with FIG. 3 illustrates a preferred embodiment of the present invention wherein any engine component can be rapidly sighted in a two step process. The first step of the aforementioned two step process is for the individual to look about the perimeter of the engine compartment walls and to locate the brightly colored decal (note FIG. 1) citing the engine component that the individual is seeking. As shown in FIGS. 1 and 3 there is an oil dipstick single-coordinate decal 19. It is known to be a single-coordinate decal because of its particular shape (in this case, rectangular). On the decal 19 is a separate arrow decal 20 which is independently adhered to the decal 19 in direct and straight alignment with the oil dipstick 5. This allows an individual to open the hood and immediately glance down at the brightly colored decal 19, as illustrated in FIG. 1, only to then immediately envision a direct line to that component which in this instance is an oil dipstick 5. Also illustrated in FIGS. 1 and 3 are automatic transmission fluid dipstick double-coordinate decals 21 and 22. Once again, it can be immediately recognized that these decals form a double rectangular coordinate location system by noting that decal 21 is of a triangular configuration. Decal 22 will also be of the triangular configuration and of the same color as decal 21. It is apparent that any shape can be used in lieu of the triangle. Optionally, if production of similar decal shapes is preferred then a number "2" in parenthesis on the decal can signify the double-coordinate system in lieu of using a different shaped decal to signify such a system. The double-coordinate system is used when the engine component is more hidden e.g. down low and/or far back in the engine compartment or is blocked from direct view when one is standing in the foreground of the perimeter decal. It is further understood that the perimeter decals can take on shapes which include letters e.g. an "O" for oil or "T" for transmission. Note also that a large variety of colors could be used such as fluorescent colors in red, green, yellow etc. It is also readily apparent that the perimeter decals can be placed on any of the four walls defining the engine compartment. Further note that the perimeter decals can identify a multitude of accessories or components as noted in FIG. 1 with decal 23 aligning the coolant reserve system 9 and decal 24 aligning the brake master cylinder 12. It is also readily apparent that the decals form a means for advertising in that brand names etc. could be written on the perimeter decals in eye attracting manners.

Figure 4:
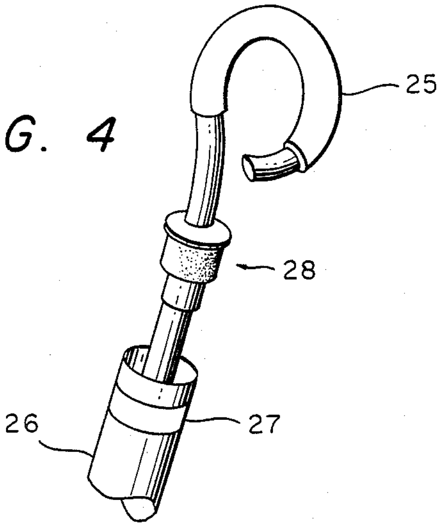
FIG. 4 is an enlarged perspective view of a dipstick according to a preferred embodiment of the present invention.

FIG. 4 illustrates an embodiment of the second step of the aforementioned two step process. As discussed prior, the first step of the two step process in sighting engine components was to look about the perimeter walls of the engine compartment and to locate the brightly colored decal e.g. the dipstick decals 19 or 21 and 22. The individual would then envision an imaginary straight line(s) on which the desired component would lie. FIG. 4 illustrates a dipstick 28 wherein the looped or graspable portion has a brightly colored detection means 25 fastened thereto. The color of the detection means 25 is preferably similar to that of the brightly colored decal thereby leading to immediate recognition. The filler neck 26, which extends from the fluid reservoir, may further have a color band 27 which is similar in color to the detection means 25 and decal. The band 27 assists in finding the filler neck 26 for reinsertion of the dipstick 28 which was removed for checking the fluid level. The band 27 can also be a decal if desired. The detection means 25, if located in close proximity to the engine block, will be made of a material which is able to withstand the high temperatures and heat fluctuations yet still have the material characteristics of flexibility, etcetera.

Figure 5:
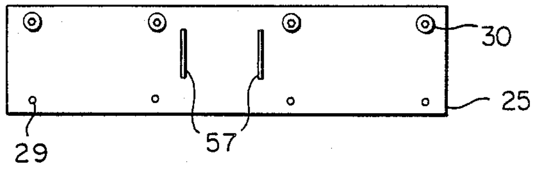
FIG. 5 is a perspective view of an embodiment of a detection means which forms a part of the second step in sighting components according to the present invention.
Figure 5A:
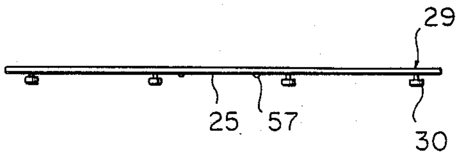
FIG. 5A is a side view of the detection means as illustrated in FIG. 5.
Figure 6:
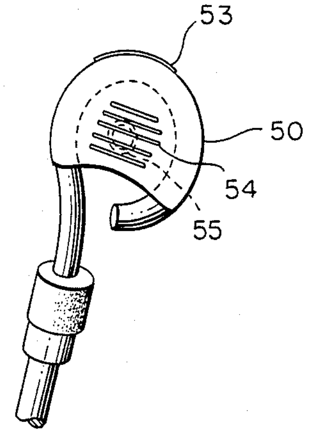
FIG. 6 is a perspective view of another embodiment of a detection means according to the present invention.
Figure 7:
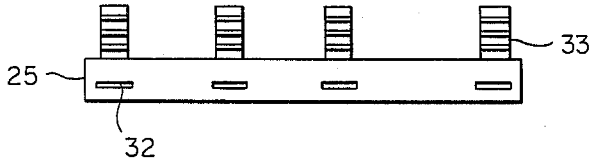
FIG. 7 illustrates still another embodiment of a detection means according to the present invention.
Figure 8:
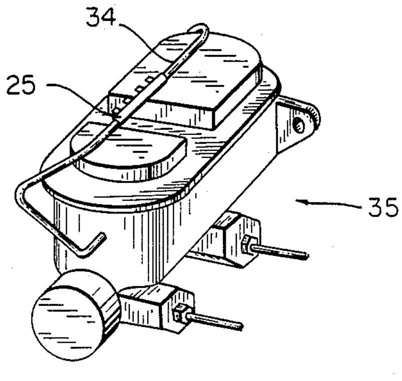
FIG. 8 shows a sample use of a detection means according to the present invention.

FIGS. 5 through 7 illustrate several embodiments of a brightly colored detection means. The detection means of the present invention is made of a flexible, relatively thin and brightly colored sheet. Although it is also believed novel to form the detection means by applying brightly colored tape about the component, it is believed that the adhesive would become gummy due to the high temperature gradients and is therefore not preferred. It is also believed novel to use a brightly colored paint which could be applied easily to metal surfaces either by dipping or by spraying wherein the paint could match the perimeter decal's color. This process is messy however unless preformed at factory or supplier levels. In the configuration as illustrated in FIGS. 5 and 5A the detection means 25 comprises four apertures 29 passing completely through the thin sheet 25. Opposite each of the apertures 29 is a respective mushroom shaped projection 30 which passes through each of the apertures in a locking manner once the thin sheet is folded about its longitudinal central axis in a wrapping manner about, for example, a dipstick. In a means to resist slippage along the length of the folded sheet 25, there are also provided ridges 57. It is, however, readily understood that any common suitable frictional means would be sufficient to prohibit such movement. Note that the detection means 25 of FIGS. 5 and 5A, however, is most likely to be used on tubing which is mostly linear in configuration. Such can be found, for example, on dipsticks wherein the handle is merely a 90 degree bend from the vertically rising dipstick. That particular type of dipstick would not possess the loop-type configuration. Similarly, such tubing can be found, as illustrated in FIG. 8, on the clamping bar 34 of the brake master cylinder, It is understood that the thin sheet as illustrated in FIG. 5 could further be perforated at portions for easy adaptation to certain components which may be curvilinear in configuration, etcetera, or that the sheet may be cut with scissors also in a means to adapt the thin sheet to various other components.

Figure 6A:
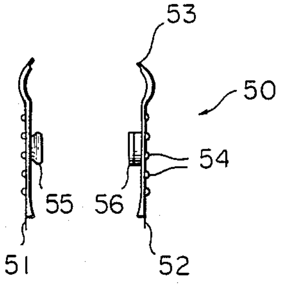
FIG. 6A is a side view of the detection means as illustrated in FIG. 6.

FIG. 6 is a perspective view of a preferred embodiment of the present invention wherein there is provided a snap-on unit 50 designed for easy installation about a dipstick with a loop-type handle. The unit, as shown in cross-section in FIG. 6A, comprises a left side portion 51 and a right side portion 52. The two portions are integrally connected together by a flexible coupling 53 at the manufacturing stage. For illustration purposes only, FIG. 6A shows the coupling 53 as detached. Each portion 51 and 52 is provided with frictional ridges 54 for assisting in gripping the unit between the thumb and index finger for easy removal of the dipstick. Each portion 51 and 52 is further provided with fastening means 55 and 56, respectively. The unit is quickly and simply secured to the loop of a dipstick by wrapping the unit 50 about the top of the dipstick such that the flexible coupling 53 rests atop the dipstick loop as shown in FIG. 6 and then to squeeze the portions 51 and 52 together such that the fastening means 55 and 56 lockingly fit together in the center of the loop.

FIG. 7 illustrates a detection means 25 of the present invention which is similar in flexibility, color and material as that of FIGS. 5 and 5A. In this embodiment, however, the thin sheet 25 Has four slots 32 which receive four respective flexible straps 33. The straps 33 have projections (four shown on each strap 33) which provide a means for adjustment such that the detections means can fit grippingly about a varied amount of small diameter tubing. Such tubing can be found in forming the grasping portion of a dipstick or can be found in forming the clamping bar 34 as illustrated on the brake master cylinder 35 as shown in FIG. 8, etcetera.

Figure 9:
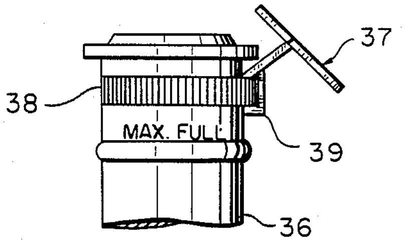
FIG. 9 is a perspective view of a further embodiment of a detection means according to the present invention.
Figure 10:
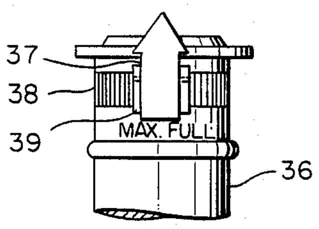
FIG. 10 is a frontal view of the detection means as shown in FIG. 9.

FIGS. 9 and 10 are another embodiment of the present invention. In each of these figures the detection means 37 is shaped as an arrow. It is understood that the shape of the detection means can actually follow any shape e.g. a square, diamond. circle, letter, etcetera and may be of various colors, combinations of colors or dimensions. The detection means 37 of FIGS. 9 and 10 are actually integral units which have snap-type retention holders 39 formed therewith. The retention holder is formed as a channel through which a similarly colored band 38 is passed through as a means to hold the detection means grippingly erect about the fluid reservoir neck. This detection means can also be fastened about hoses such that the arrow points to a critical engine component e.g. a fuel filter which is housed behind a retaining nut at the end of a fuel line in a carburetor body and cannot be seen.

Figure 11:
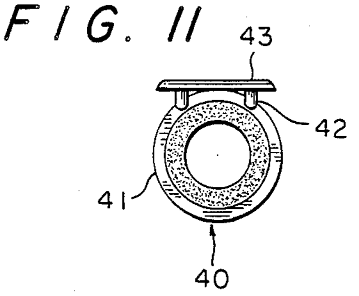
FIG. 11 is a cross-sectional view of a conduit found in an area about the engine and a detection means fastened thereto according to still a further embodiment of the invention.

FIG. 11 is a cross-sectional view of an engine hose 40 wherein a detection means 43 is secured via flexible clamps 41 and integral channels 42. It is understood that the flexible clamps 41 can be secured in any manner to the detection means 43. The detection means 43 is brightly colored and shaped a particular configuration for recognition as in the prior instances.

Figure 12:
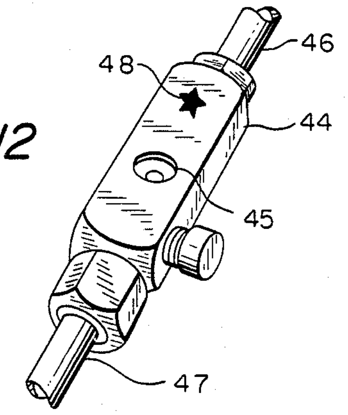
FIG. 12 is a perspective view of an A/C sight glass and a detection means according to another further embodiment of the present invention.

FIG. 12 is an illustration of an A/C sight glass 45 wherein a clear sight glass 45 indicates a proper charge of refrigerant or no refrigerant at all, which can be determined by the presence of cold air at the outlets in the car. This embodiment illustrates the use of tapes or decals, for example the star shaped decal 48 attached to the body 44 as shown, as a detection means. As prior, the color of the star would match the color of the perimeter decal if a perimeter decal was used. It is also easily understood that in lieu of the star shaped decal that alternative types of detection means can be fastened to either pipes 46 or 47 as illustrated by the detection means 25 of FIGS. 5,7 and 8 or the detection means 43 of FIG. 11. It is also understood, as discussed earlier, that a dab of brightly colored paint could be used.

Figure 13:
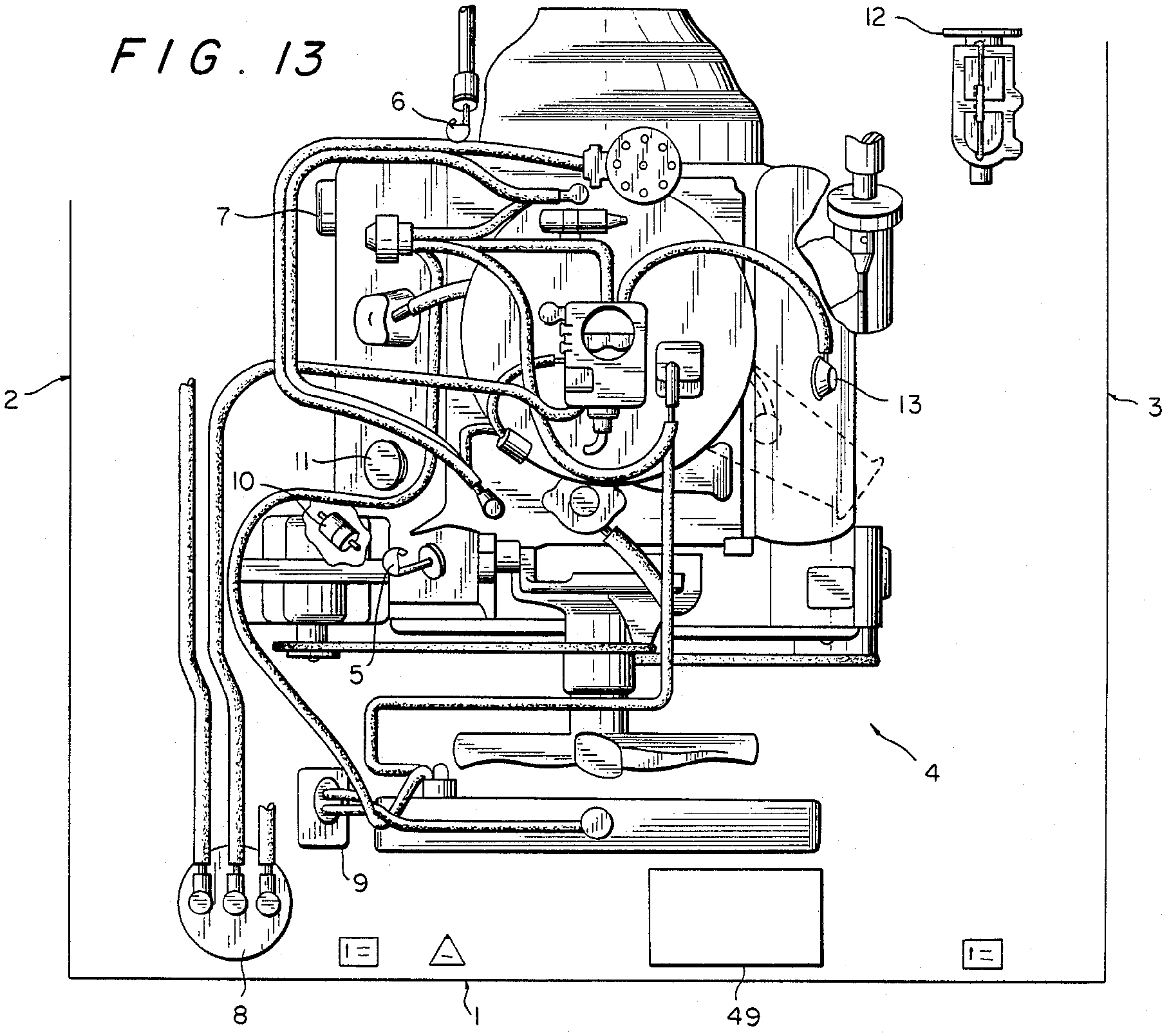
FIG. 13 illustrates still another embodiment of the present invention including a means to index the engine components according to any preferred manner of color, shape, service intervals, etcetera.

FIG. 13 is a further embodiment of the present invention wherein there is included an indexing table 49 which clearly lists, in a chart-like manner each engine component which is used and as was disclosed hereinbefore. This table could also include the proper service interval of particular components e.g. filters whether they are identified by the detection system or not. The table could simply have a mark signifying that that particular component is not identifiable by the system. The table could once again be a clear means of advertising brand names. The table can also identify components by shape and/or color etc. by using respectively shaped and colored decals which could be placed in respective columns. The table could be adhered to any open location e.g. atop the air filter cover or on the engine compartment perimeter wall space e.g. atop a strut mount.

While the present invention has been described above in the form of several preferred emodiments, it should be understood that the invention may be embodied in other forms without departing from the scope or essential characteristics thereof. The above-disclosed embodiments are therefore to be considered as being illustrative and not restrictive and the scope of the invention should be defined by the appended claims rather than the forenoted description. Further, all changes which come within the meaning and the range of equivalency of the claims are therefore intended to be embraced therein.

What is claimed is:

1. A method of sighting an engine component in a vehicle engine compartment, comprising in combination the steps of:

providing in clear view about the periphery of said engine compartment at least one first directional means;

observing said first directional means and establishing therefrom a first imaginary line extending in a first specific direction into said engine compartment, said first directional means forming the point of origin of said first imaginary line;

providing in clear view about the periphery of said engine compartment at least one second directional means spaced from said first directional means;

observing said second directional means and establishing therefrom a second imaginary line extending in a second specific direction into said engine compartment, said second directional means forming the point of origin of said second imaginary line; and locating an engine component by determining the point of intersection of said imaginary lines.

2. A method as claimed in claim 1, wherein:

said first and second directional means are similar in shape and color.

3. A method for sighting at least one component housed within a vehicle compartment area, comprising the steps of:

providing in clear view about the periphery of said vehicle compartment area at least one first directional means;

observing said first directional means and establishing therefrom a first imaginary line extending in a first specific direction into said vehicle compartment area, said first directional means forming the point of origin of said first imaginary line;

providing a detection means within said vehicle compartment area in said first specific direction in a plane including said first line and adjacent said component, said detection means having identifying means related to said component and to said first directional means; and locating said component along said imaginary line which begins at said first directional means by visually matching the first directional means and the detection means.

4. A method as claimed in claim 3, including the steps of:

providing in clear view about the periphery of said vehicle compartment area at least one second directional means; and observing said second directional means and establishing therefrom a second imaginary line extending in a second specific direction into said vehicle compartment area, said second imaginary line having its point of origin at said second directional means, said first imaginary line and said second imaginary line intersecting at a point which lies along an imaginary vertical line passing through said detection means.

5. A method as claimed in claim 3, wherein:

said detection means is similar in color to said first directional means.

6. A method for sighting at least one component housed within a vehicle compartment area, comprising in combination the steps of:

gaining clear view to at least a portion of the vehicle compartment area;

providing in clear view a first directional indicia means at a peripheral portion of said compartment area;

observing said first directional indicia means and envisioning a first imaginary line extending therefrom in a first specific direction in said vehicle compartment area, said first directional indicia means forming the point of origin of said first imaginary line; and providing a detection indicia means in said vehicle compartment area located in said first specific direction in a plane including said first imaginary line and adjacent said component, said first imaginary line establishing visual connection between said first directional indicia means and said detection means, whereby the component may be quickly and easily located by visually establishing said first imaginary line from said first directional means and across said compartment and then correlating said detection means with said first imaginary line.

7. A method as claimed in claim 6, including the steps of:

providing in clear view about the periphery of said vehicle compartment area at least one second directional indicia means; and observing said second directional indicia means and establishing therefrom a second imaginary line extending in a second specific direction into said vehicle compartment area, said first and second imaginary lines intersecting at a point which lies along an imaginary vertical line passing through said detection means.

* * * * *